United States Patent
Jeon et al.

(10) Patent No.: US 9,954,254 B2
(45) Date of Patent: Apr. 24, 2018

(54) ELECTROLYTE FOR LITHIUM SECONDARY BATTERY AND LITHIUM SECONDARY BATTERY INCLUDING THE SAME

(71) Applicant: LG Chem, Ltd., Seoul (KR)

(72) Inventors: Jong Ho Jeon, Daejeon (KR); Yoo Seok Kim, Daejeon (KR); Doo Kyung Yang, Daejeon (KR); Shulkee Kim, Daejeon (KR)

(73) Assignee: LG Chem, Ltd. (KR)

( * ) Notice: Subject to any disclaimer, the term of this patent is extended or adjusted under 35 U.S.C. 154(b) by 645 days.

(21) Appl. No.: 14/501,685

(22) Filed: Sep. 30, 2014

(65) Prior Publication Data

US 2015/0017515 A1    Jan. 15, 2015

Related U.S. Application Data

(63) Continuation of application No. PCT/KR2013/003333, filed on Apr. 19, 2013.

(30) Foreign Application Priority Data

Apr. 20, 2012   (KR) .................. 10-2012-0041306

(51) Int. Cl.
| | |
|---|---|
| H01M 10/0569 | (2010.01) |
| H01M 4/525 | (2010.01) |
| H01M 10/052 | (2010.01) |
| H01M 4/505 | (2010.01) |
| H01M 4/485 | (2010.01) |
| H01M 10/0525 | (2010.01) |
| H01M 4/131 | (2010.01) |

(52) U.S. Cl.
CPC ....... *H01M 10/0569* (2013.01); *H01M 4/485* (2013.01); *H01M 4/505* (2013.01); *H01M 4/525* (2013.01); *H01M 10/052* (2013.01); *H01M 10/0525* (2013.01); *H01M 4/131* (2013.01); *H01M 2220/10* (2013.01); *H01M 2220/20* (2013.01); *H01M 2300/0037* (2013.01); *Y02E 60/122* (2013.01); *Y02T 10/7011* (2013.01)

(58) Field of Classification Search
CPC ........... H01M 10/0569; H01M 10/052; H01M 10/0525; H01M 4/485; H01M 4/131; H01M 4/505; H01M 4/525; H01M 2220/10; H01M 2220/20; H01M 2300/0037; Y02E 60/122; Y02T 10/7011
See application file for complete search history.

(56) References Cited

U.S. PATENT DOCUMENTS

| | | | |
|---|---|---|---|
| 5,545,468 A | 8/1996 | Koshiba et al. | |
| 9,484,598 B2* | 11/2016 | Jeon ................ | H01M 10/0569 |
| 9,634,356 B2* | 4/2017 | Jeon ................ | H01M 10/0569 |
| 2002/0015895 A1* | 2/2002 | Ueda ................ | H01M 10/0567 429/324 |
| 2005/0031963 A1 | 2/2005 | Im et al. | |
| 2005/0170250 A1 | 8/2005 | Ohzuku et al. | |
| 2005/0191551 A1 | 9/2005 | Tsujimoto et al. | |
| 2005/0271943 A1 | 12/2005 | Park et al. | |
| 2006/0046155 A1* | 3/2006 | Inagaki ............. | H01M 10/0569 429/332 |
| 2007/0178386 A1* | 8/2007 | Takeda ............. | H01M 10/0569 429/331 |
| 2007/0287071 A1 | 12/2007 | Chiga et al. | |
| 2008/0241703 A1* | 10/2008 | Yamamoto ........ | H01M 10/0569 429/338 |
| 2010/0081062 A1 | 4/2010 | Chiga et al. | |
| 2010/0266904 A1 | 10/2010 | Jeon et al. | |
| 2011/0027663 A1* | 2/2011 | Ohkubo ............ | H01M 4/485 429/326 |
| 2011/0123870 A1* | 5/2011 | Oh ................... | H01M 10/0569 429/326 |
| 2011/0165472 A1 | 7/2011 | Kim et al. | |
| 2011/0206999 A1 | 8/2011 | Jeon et al. | |
| 2012/0007560 A1* | 1/2012 | Smart .............. | H01M 10/0569 429/200 |
| 2013/0029231 A1 | 1/2013 | Jeon et al. | |
| 2013/0189591 A1* | 7/2013 | Nishimura ....... | H01M 10/0569 429/331 |
| 2014/0106238 A1* | 4/2014 | Giroud ............ | H01M 10/0569 429/332 |

FOREIGN PATENT DOCUMENTS

| | | |
|---|---|---|
| CN | 1320980 A | 11/2001 |
| CN | 1701459 A | 11/2005 |
| CN | 101803099 A | 8/2010 |
| EP | 1 936 731 | * 6/2008 |
| EP | 2 262 047 | * 12/2010 |

(Continued)

OTHER PUBLICATIONS

Extended Search Report from European Application No. 13777530.0, dated Jan. 14, 2016.
Zhengcheng Zhang, et al., "High Voltage Electrolyte for Lithium Batteries." Argonne National Laboratory, Vehicle Technologies Program, Annual Merit Review and Peer Evaluation Meeting, Washington, D.C., Jun. 9-13, 2011.
Patoux, et al., "High voltage spinel oxides for Li-ion batteries: From the material research to the application." Journal of Power Sources, Elsevier SA, CH, vol. 189, No. 1, Aug. 27, 2008, pp. 344-352.
Search Report from Office Action issued in Chinese Application No. 201380019538.0 dated Dec. 16, 2016.
International Search Report from PCT/KR2013/003333 dated Jul. 11, 2013.

*Primary Examiner* — Laura Weiner
(74) *Attorney, Agent, or Firm* — Lerner, David, Littenberg, Krumholz & Mentlik, LLP

(57) ABSTRACT

Disclosed are an electrolyte for a lithium secondary battery which includes a non-aqueous solvent and a lithium salt and a lithium secondary battery including the same. The electrolyte includes 1 to 60 wt % of a cyclic carbonate and 40 to 99 wt % of a linear solvent based on a total weight of the non-aqueous solvent.

9 Claims, No Drawings

(56) References Cited

FOREIGN PATENT DOCUMENTS

| | | | |
|---|---|---|---|
| JP | 2001-210324 A | | 8/2001 |
| JP | 2006-66341 | * | 3/2006 |
| JP | 2006066341 A | | 3/2006 |
| JP | 2008050259 A | | 3/2008 |
| JP | 2008-147117 | * | 6/2008 |
| JP | 2008-192391 A | | 8/2008 |
| JP | 2009295507 A | | 12/2009 |
| KR | 10-0262852 B1 | | 8/2000 |
| KR | 2005-0024270 A | | 3/2005 |
| TW | 248617 B | | 6/1995 |
| TW | 200541141 A | | 12/2005 |
| WO | WO 2009/111860 | * | 9/2009 |
| WO | WO 2012/046514 | * | 4/2012 |
| WO | WO 2012/172194 | * | 12/2012 |

* cited by examiner

ELECTROLYTE FOR LITHIUM SECONDARY BATTERY AND LITHIUM SECONDARY BATTERY INCLUDING THE SAME

CROSS-REFERENCE TO RELATED APPLICATIONS

The present application is a continuation of International Application No. PCT/KR2013/003333 filed Apr. 19, 2013, which claims priority from Korean Application No. 10-2012-0041306filed Apr. 20, 2012, the disclosures of which are hereby incorporated herein by reference.

TECHNICAL FIELD

The present invention relates to an electrolyte for a lithium secondary battery and a lithium secondary battery including the same. More specifically, the present invention relates to an electrolyte for a lithium secondary battery which includes a non-aqueous solvent and a lithium salt, wherein the electrolyte includes 1 to 60 wt % of a cyclic carbonate and 40 to 99 wt % of a linear solvent, based on a total weight of the non-aqueous solvent, and a lithium secondary battery including the same.

BACKGROUND ART

As energy source prices are increasing due to depletion of fossil fuels and interest in environmental pollution is escalating, demand for environmentally-friendly alternative energy sources is bound to play an increasing role in future life. Thus, research into various power generation techniques such as nuclear energy, solar energy, wind energy, tidal power, and the like, continues to be underway, and power storage devices for more efficient use of the generated energy are also drawing much attention.

In particular, demand for lithium secondary batteries is rapidly increasing as mobile device technology continues to develop and demand therefore continues to increase. Recently, use of lithium secondary batteries as a power source of electric vehicles (EVs) and hybrid electric vehicles (HEVs) has been realized and the market for lithium secondary batteries continues to expand to applications such as auxiliary power suppliers through smart-grid technology.

Such lithium secondary batteries generally use metal oxides, such as $LiCoO_2$ and the like, as a cathode active material, and carbonaceous materials as an anode active material. Such lithium secondary battery is manufactured by disposing a polyolefin-based porous separator between an anode and a cathode and impregnating the resultant structure with a non-aqueous electrolyte containing a lithium salt such as $LiPF_6$ or the like. When the lithium secondary battery is charged, lithium ions of the cathode active material are deintercalated therefrom and then are intercalated into a carbon layer of the anode. When the lithium secondary battery is discharged, the lithium ions of the carbon layer are deintercalated and then are intercalated back into the cathode active material. In this regard, the non-aqueous electrolyte acts as a medium through which lithium ions migrate between the anode and the cathode. Such lithium secondary battery basically requires stability within an operating voltage range of a battery, and the capability to transfer ions at a sufficiently high rate.

However, lithium secondary batteries have high operating potentials while having high energy density and discharge voltage and thus high energy may instantaneously flow therein. Accordingly, when a lithium secondary battery is overcharged to 4.2 V or higher, the electrolyte starts to decompose, and when the temperature of the electrolyte increases, the electrolyte may readily reach an ignition point, which results in high possibility of combustion.

In addition, recently, instead of using conventional electrode active materials, research into use of spinel-structure lithium nickel-based metal oxides in cathodes or use of lithium titanium oxides as anode active materials has been conducted.

In particular, spinel-structure lithium metal oxides having formula $LiNi_xMn_{2-x}O_4$ where x=0.01 to 0.6, which are active materials for high-voltage applications since they have an average voltage of 4.7 V, reach an oxidation potential of an electrolyte and thus the electrolyte is oxidized, resulting in generation of by-products such as gas and the like, which deteriorates secondary battery safety.

Therefore, there is a need to develop a technology that can address these problems.

DISCLOSURE

Technical Problem

Therefore, the present invention has been made to solve the above problems and other technical problems that have yet to be resolved.

As a result of a variety of extensive and intensive studies and experiments, the inventors of the present invention found that when an electrolyte for a lithium secondary battery which includes predetermined amounts of a particular linear solvent and a cyclic carbonate is used, desired effects may be achieved, thus completing the present invention.

Technical Solution

In accordance with one aspect of the present invention, provided is an electrolyte for a lithium secondary battery which includes a non-aqueous solvent and a lithium salt, wherein the electrolyte includes 1 to 60 wt % of a cyclic carbonate and 40 to 99 wt % of a linear solvent, based on a total weight of the non-aqueous solvent.

As described above, the lithium secondary battery has high operating potential and thus the electrolyte may be oxidized at high potential, and by-products such as gas or the like are a cause of reduce lithium secondary battery safety.

Thus, the inventors of the present invention confirmed that, as is in the experimental example below, when an electrolyte for a secondary battery which includes predetermined amounts of a particular linear solvent and a cyclic carbonate is used, oxidation stability of the electrolyte is enhanced, whereby the secondary battery has enhanced rate and lifespan characteristics.

In particular, the cyclic carbonate and the linear solvent are any cyclic carbonate and linear solvent known in the art. Examples thereof include, but are not limited to, propylene carbonate (PC), ethylene carbonate (EC), butylene carbonate (BC), diethyl carbonate (DEC), dimethyl carbonate (DMC), dipropyl carbonate (DPC), methyl propionate (MP), dimethylsulfoxide, acetonitrile, dimethoxy ethane, diethoxy ethane, tetrahydrofuran, N-methyl-2-pyrrolidone (NMP), ethylmethyl carbonate (EMC), γ-butyrolactone (GBL), fluoroethylene carbonate (FEC), methyl formate, ethyl formate, propyl formate, methyl acetate, ethyl acetate, propyl acetate, pentyl acetate, methyl propionate, ethyl propionate, butyl propionate, and mixtures thereof. In addition, halogen derivatives of the organic solvent and linear ester materials may be used.

For example, the cyclic carbonate may be at least one selected from the group consisting of EC, PC, BC, and FEC, and the linear solvent may be at least one linear carbonate or ester selected from the group consisting of DMC, DEC, EMC, and MP.

More specifically, the cyclic carbonate may be FEC, and the linear solvent may be DMC or MP. When FEC is used as the cyclic carbonate, oxidation stability of the electrolyte is improved and, as a result, overall characteristics of the lithium secondary battery may be enhanced.

The electrolyte for a lithium secondary battery may include 5 to 50 wt % of a cyclic carbonate and 50 to 95 wt % of a linear solvent, for example, 5 to 20 wt % of a cyclic carbonate and 80 to 95 wt % of a linear solvent. When the amount of the cyclic carbonate is too small, desired effects, i.e., oxidation stability of the electrolyte, may not be obtained. On the other hand, when the amount of the cyclic carbonate is too large, rate characteristics may be somewhat deteriorated.

The present invention also provides a lithium secondary battery including the above-described electrolyte.

The lithium secondary battery may include, as a cathode active material, layered compounds such as lithium cobalt oxide (LiCoO$_2$) and lithium nickel oxide (LiNiO$_2$), or compounds substituted with one or more transition metals; lithium manganese oxides such as compounds of Formula Li$_{1+x}$Mn$_{2-x}$O$_4$ where 0≤x≤0.33, LiMnO$_3$, LiMn$_2$O$_3$, and LiMnO$_2$; lithium copper oxide (Li$_2$CuO$_2$); vanadium oxides such as LiV$_3$O$_8$, LiV$_3$O$_4$, V$_2$O$_5$, and Cu$_2$V$_2$O$_7$; Ni-site type lithium nickel oxides of Formula LiNi$_{1-x}$M$_x$O$_2$ where M=Co, Mn, Al, Cu, Fe, Mg, B, or Ga, and 0.01≤x≤0.3; lithium manganese composite oxides of Formula LiMn$_{2-x}$O$_2$ where M=Co, Ni, Fe, Cr, Zn, or Ta, and 0.01≤x≤0.1), or Formula Li$_2$Mn$_3$MO$_8$ where M=Fe, Co, Ni, Cu, or Zn; spinel-structure lithium manganese composite oxides of Formula LiNi$_x$Mn$_{2-x}$O$_4$ where x=0.01 to 0.6; LiMn$_2$O$_4$ in which some of the Li atoms are substituted with alkaline earth metal ions; disulfide compounds; Fe$_2$(MoO$_4$)$_3$; and the like.

In addition, the lithium secondary battery may include, as an anode active material, carbon such as hard carbon and graphite-based carbon; metal composite oxides such as Li$_x$Fe$_2$O$_3$ where 0≤x≤1, Li$_x$WO$_2$ where 0≤x≤1, and Au$_x$Me$_{1-x}$Me'$_y$O$_z$ where Me: Mn, Fe, Pb or Ge; Me': Al, B, P, Si, Group I, Group II and Group III elements, or halogens; 0<x≤1; 1≤y≤3; and 1≤z≤8; lithium metals; lithium alloys; silicon-based alloys; tin-based alloys; metal oxides such as AuO, SnO$_2$, PbO, PbO$_2$, Pb$_2$O$_3$, Pb$_3$O$_4$, Sb$_2$O$_3$, Sb$_2$O$_4$, Sb$_2$O$_5$, GeO, GeO$_2$, Bi$_2$O$_3$, Bi$_2$O$_4$, and Bi$_2$O$_5$; conductive polymers such as polyacetylene; Li—Co—Ni based materials; titanium oxides; lithium titanium oxides; and the like.

In one embodiment, the lithium secondary battery may include a cathode including a spinel-structure lithium nickel manganese composite oxide represented by Formula 1 below as a cathode active material and an anode including a lithium metal oxide represented by Formula 2 below as an anode active material:

(1)

(2)

wherein 0.9≤x≤1.2, 0<y<2, 0≤z<0.2; M is at least one element selected from the group consisting of Al, Mg, Ni, Co, Fe, Cr, V, Ti, Cu, B, Ca, Zn, Zr, Nb, Mo, Sr, Sb, W, Ti, and Bi; and A is at least one monovalent or divalent anion.

In Formulae 1 and 2 above, M' is at least one element selected from the group consisting of Ti, Sn, Cu, Pb, Sb, Zn, Fe, In, Al, and Zr; 0.1≤a≤4 and 0.2≤b≤4, wherein a and b are determined according to oxidation number of M'; 0≤c<0.2, wherein c is determined according to oxidation number of A'; and A' is at least one monovalent or divalent anion.

In particular, the spinel-structure lithium nickel manganese composite oxide of Formula 1 may be represented by Formula 3 below:

(3)

wherein 0.9≤x≤1.2 and 0.4≤y≤0.5.

More particularly, the spinel-structure lithium nickel manganese composite oxide of Formula 3 may be LiNi$_{0.5}$Mn$_{1.5}$O$_4$ or LiNi$_{0.4}$Mn$_{1.6}$O$_4$.

The lithium metal oxide of Formula 2 may include a lithium metal oxide represented by Formula 4 below:

(4)

wherein 0.5≤a≤3 and 1≤b≤2.5.

Specifically, the lithium metal oxide of Formula 4 may be Li$_{1.33}$Ti$_{1.67}$O$_4$ or LiTi$_2$O$_4$.

A lithium titanium oxide such as Li$_{1.33}$Ti$_{1.67}$O$_4$ has high electric potential with respect to lithium as compared to graphite and exhibits high safety because lithium and a reaction product of the electrolyte are not deposited at an interface. However, the lithium titanium oxide has a high electric potential of approximately 1.5 V with respect to lithium, and thus, when lithium titanium oxide is used together with a cathode active material that is commonly used in the art, such as a lithium cobalt oxide or the like, a discharge voltage of a battery cell drops to about 2.4 V. In addition, lithium titanium oxide has a theoretical capacity of 175 mAh/g, which is similar to that of graphite, and thus improvement in energy density is limited.

By contrast, when the lithium titanium oxide as an anode active material and the spinel-structure lithium nickel manganese composite oxide are used together, high voltage may be maintained and a lithium secondary battery including these oxides may exhibit high capacity and excellent output characteristics.

In other words, the lithium secondary battery according to the present invention includes the above-described particular non-aqueous solvent and thus, even though the spinel-structure lithium nickel manganese composite oxide, which exhibits high voltage, is used, the electrolyte exhibits high oxidation stability, which results in enhanced rate characteristics and lifespan characteristics.

The lithium secondary battery according to the present invention includes a cathode, which is prepared by coating a mixture of the cathode active material, a conductive material, and a binder on a cathode current collector and drying and pressing the coated cathode current collector, and an anode prepared using the same method as that used to manufacture the cathode. In this case, the mixture may further include a filler as desired.

The cathode current collector is generally fabricated to a thickness of 3 to 500 μm. The cathode current collector is not particularly limited so long as it does not cause chemical changes in the fabricated secondary battery and has high conductivity. For example, the cathode current collector may be made of stainless steel, aluminum, nickel, titanium, sintered carbon, or aluminum or stainless steel surface-treated with carbon, nickel, titanium, silver, or the like. The cathode current collector may have fine irregularities at a surface thereof to increase adhesion between the cathode active material and the cathode current collector. In addition, the cathode current collector may be used in any of various forms including films, sheets, foils, nets, porous structures, foams, and non-woven fabrics.

The conductive material is typically added in an amount of 1 to 50 wt % based on the total weight of the mixture including the cathode active material. There is no particular limit as to the conductive material, so long as it does not cause chemical changes in the fabricated battery and has conductivity. Examples of conductive materials include graphite such as natural or artificial graphite; carbon black such as carbon black, acetylene black, Ketjen black, channel black, furnace black, lamp black, and thermal black; conductive fibers such as carbon fibers and metallic fibers; metallic powders such as carbon fluoride powder, aluminum powder, and nickel powder; conductive whiskers such as zinc oxide and potassium titanate; conductive metal oxides such as titanium oxide; and polyphenylene derivatives.

The binder is a component assisting in binding between the electrode active material and the conductive material and in binding of the electrode active material to the electrode current collector. The binder is typically added in an amount of 1 to 50 wt % based on the total weight of the mixture including the cathode active material. Examples of the binder include polyvinylidene fluoride, polyvinyl alcohols, carboxymethylcellulose (CMC), starch, hydroxypropylcellulose, regenerated cellulose, polyvinyl pyrrolidone, tetrafluoroethylene, polyethylene, polypropylene, ethylene-propylene-diene terpolymer (EPDM), sulfonated EPDM, styrene butadiene rubber, fluorine rubber, and various copolymers.

The filler is optionally used as a component to inhibit cathode expansion. The filler is not particularly limited so long as it is a fibrous material that does not cause chemical changes in the fabricated battery. Examples of the filler include olefin-based polymers such as polyethylene and polypropylene; and fibrous materials such as glass fiber and carbon fiber.

An anode current collector is typically fabricated to a thickness of 3 to 500 μm. The anode current collector is not particularly limited so long as it does not cause chemical changes in the fabricated secondary battery and has conductivity. For example, the anode current collector may be made of copper, stainless steel, aluminum, nickel, titanium, sintered carbon, copper or stainless steel surface-treated with carbon, nickel, titanium, or silver, and aluminum-cadmium alloys. Similar to the cathode current collector, the anode current collector may also have fine irregularities at a surface thereof to enhance adhesion between the anode current collector and the anode active material. In addition, the anode current collector may be used in various forms including films, sheets, foils, nets, porous structures, foams, and non-woven fabrics.

The lithium secondary battery may have a structure in which an electrode assembly, which includes a cathode, an anode, and a separator disposed between the cathode and the anode, is impregnated with the electrolyte for a lithium secondary battery which includes a non-aqueous solvent and a lithium salt.

The separator is disposed between the cathode and the anode and, as the separator, an insulating thin film having high ion permeability and mechanical strength is used. The separator typically has a pore diameter of 0.01 to 10 μm and a thickness of 5 to 300 μm. As the separator, sheets or non-woven fabrics made of an olefin polymer such as polypropylene, glass fibers or polyethylene, which have chemical resistance and hydrophobicity, are used. When a solid electrolyte such as a polymer is employed as the electrolyte, the solid electrolyte may also serve as both the separator and electrolyte.

The electrolyte containing a lithium salt is composed of a non-aqueous organic solvent electrolyte and a lithium salt.

The lithium salt is a material that is readily soluble in the non-aqueous electrolyte. Examples thereof include, but are not limited to, LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $(CF_3SO_2)_2NLi$, chloroborane lithium, lower aliphatic carboxylic acid lithium, lithium tetraphenyl borate, and imide.

In addition, in order to improve charge/discharge characteristics and flame retardancy, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride, or the like may be added to the electrolyte. In some cases, in order to impart incombustibility, the electrolyte may further include a halogen-containing solvent such as carbon tetrachloride and ethylene trifluoride. In addition, in order to improve high-temperature storage characteristics, the electrolyte may further include carbon dioxide gas, fluoro-ethylene carbonate (FEC), propene sultone (PRS), or the like.

In one embodiment, the lithium salt-containing non-aqueous electrolyte may be prepared by adding a lithium salt such as $LiPF_6$, $LiClO_4$, $LiBF_4$, $LiN(SO_2CF_3)_2$, or the like to a mixed solvent including EC, BC, FEC, or PC, which is a high dielectric solvent and a cyclic carbonate, and DEC, DMC, MP, or EMC, which is a low viscosity solvent and a linear carbonate.

The present invention also provides a battery module including the lithium secondary battery as a unit cell and a battery pack including the battery module.

The battery pack may be used as a power source for medium and large devices that require stability at high temperature, long cycle life, and high rate characteristics.

Examples of such medium and large devices include, but are not limited to, electric electric motor-driven power tools; electric vehicles (EVs), hybrid electric vehicles (HEVs), and plug-in hybrid electric vehicles (PHEVs); electric two-wheeled vehicles such as e-bikes and e-scooters; electric golf carts; and systems for storing power.

Effects of Invention

As apparent from the fore-going, an electrolyte for a lithium secondary battery according to the present invention includes predetermined amounts of a particular linear solvent and a cyclic carbonate and thus the electrolyte may have improved oxidation stability and a lithium secondary battery including the same may exhibit excellent rate characteristics and lifespan characteristics.

BEST MODE

Now, the present invention will be described in more detail with reference to the following examples. These examples are provided only for illustration of the present invention and should not be construed as limiting the scope and spirit of the present invention.

Example 1

$Li_{1.33}Ti_{1.67}O_4$ as an anode active material, Denka black as a conductive material, and PVdF as a binder were added to NMP in a weight ratio of 95:2.5:2.5 and the components were mixed to prepare an anode composite material. Thereafter, the anode composite material was coated on copper foil having a thickness of 20 μm and the coated copper foil was rolled and dried, thereby completing manufacture of an anode.

Separately, $LiNi_{0.5}Mn_{1.5}O_4$ as a cathode active material, Denka black as a conductive material, and PVdF as a binder were added to NMP in a weight ratio of 95:2.5:2.5 and the components were mixed to prepare a cathode composite material. Thereafter, the cathode composite material was coated on aluminum foil having a thickness of 20 μm and the coated aluminum foil was rolled and dried, thereby completing manufacture of a cathode.

Afterwards, a polyethylene film (Celgard, thickness: 20 μm) was disposed as a separator between the anode and the cathode, and a liquid electrolyte containing 1M $LiPF_6$ in a mixed solvent of FEC and DMC in a weight ratio of 10:90 was injected thereinto, thereby completing manufacture of a coin cell.

Examples 2 to 8

Coin cells were manufactured in the same manner as in Example 1, except that electrolytes having compositions as shown in Table 1 below were used.

Comparative Example 1

A coin cell was manufactured in the same manner as in Example 1, except that a liquid electrolyte containing 1M $LiPF_6$ in a mixed solvent of FEC and DMC in a weight ratio of 70:30 was used.

Comparative Example 2

A coin cell was manufactured in the same manner as in Example 1, except that $LiNi_{1/3}Mn_{1/3}CO_{1/3}O_2$ was used as a cathode active material.

Comparative Example 3

A coin cell was manufactured in the same manner as in Example 1, except that graphite was used as an anode active material.

Experimental Example 1

Rate characteristics of the coin cells manufactured according to Examples 1 to 8 and Comparative Examples 1 to 3 were measured and measurement results are shown in Table 1 below.

TABLE 1

| | | LTO/LNMO (1.5 to 3.5 V, coin full-cell) rate test (1C-rate = 1.49 mA) | | | |
|---|---|---|---|---|---|
| | | 3C/3C vs. 3C/3C | 5C/5C vs. 3C/3C | 10C/10C vs. 3C/3C | 20C/20C vs. 3C/3C |
| Example 1 | FEC/DMC 10:90 wt % 1M $LiPF_6$ | 100% 1.48 mAh | 100% | 87% | 51% |
| Example 2 | FEC/MP 10:90 wt % 1M $LiPF_6$ | 100% 1.48 mAh | 100% | 93% | 66% |
| Example 3 | EC/DMC 10:90 wt % 1M $LiPF_6$ | 100% 1.48 mAh | 99% | 56% | 17% |
| Example 4 | PC/DMC 10:90 wt % 1M $LiPF_6$ | 100% 1.47 mAh | 98% | 51% | 14% |
| Example 5 | EC/MP 10:90 wt % 1M $LiPF_6$ | 100% 1.49 mAh | 99% | 85% | 50% |
| Example 6 | PC/MP 10:90 wt % 1M $LiPF_6$ | 100% 1.36 mAh | 99% | 79% | 50% |
| Example 7 | EC/EMC/DMC 30:30:40 vol % 1M $LiPF_6$ | 100% 1.30 mAh | 95% | 12% | 9% |
| Example 8 | EC/FEC/DMC 5:20:75 vol % 1M $LiPF_6$ | 100% 1.41 mAh | 97% | 43% | 12% |
| Comparative Example 1 | FEC/DMC 70:30 wt % 1M $LiPF_6$ | 100% 1.21 mAh | 88% | 7% | 4% |
| Comparative Example 2 | FEC/DMC 10:90 wt % 1M $LiPF_6$ $LiNi_{1/3}Mn_{1/3}Co_{1/3}O_2/Li_{1.33}Ti_{1.67}O_4$ | 100% 2.96 mAh | 92% | 36% | 10% |
| Comparative Example 3 | FEC/DMC 10:90 wt % 1M $LiPF_6$ $LiNi_{0.5}Mn_{1.5}O_4$/graphite | 100% 2.83 mAh | 32% | 5% | 2% |

Referring to Table 1, it can be confirmed that the coin cells of Examples 1 to 8 exhibit superior rate characteristics as compared to the coin cells of Comparative Examples 1 to 3. In particular, it can be confirmed that the coin cells of Examples 1 and 2 including FEC as a cyclic carbonate exhibit excellent rate characteristics.

Examples 9 to 17

Coin cells were manufactured in the same manner as in Example 1, except that electrolytes having compositions as shown in Table 2 below were used.

Experimental Example 2

Capacity retention ratios of the coin cells manufactured according to Examples 1, 3, and 9 to 17 were measured after 200 cycles. Measurement results are shown in Table 2 below.

TABLE 2

| | LTO/LNMO (1.5 to 3.5 V, coin full-cell) 3C/3C-rate cycle life test (1C-rate = 1.49 mA) | $200^{th}$ Capacity retention (%, vs. $1^{st}$)/capacity(mAh): $1^{st}$ -> 200th |
|---|---|---|
| Example 1 | FEC/DMC 10:90 wt % 1M $LiPF_6$ | 98.0%/1.49 mAh -> 1.46 mAh |
| Example 3 | EC/DMC 10:90 wt % 1M $LiPF_6$ | 96.5%/1.48 mAh -> 1.43 mAh |
| Example 9 | FEC/DMC 5:95 wt % 1M $LiPF_6$ | 94.0%/1.49 mAh -> 1.40 mAh |
| Example 10 | FEC/DMC 20:80 wt % 1M $LiPF_6$ | 96.6%/1.49 mAh -> 1.44 mAh |
| Example 11 | FEC/DMC 30:70 wt % 1M $LiPF_6$ | 94.6%/1.48 mAh -> 1.40 mAh |

TABLE 2-continued

| | LTO/LNMO (1.5 to 3.5 V, coin full-cell) 3C/3C-ratecycle life test (1C-rate = 1.49 mA) | 200th Capacity retention (%, vs. 1st)/capacity(mAh): 1st -> 200th |
|---|---|---|
| Example 12 | FEC/DMC 50:50 wt % 1M LiPF$_6$ | 90.8%/1.42 mAh -> 1.29 mAh |
| Example 13 | EC/EMC/DMC 30:30:40 vol % 1M LiPF$_6$ | 86.1%/1.30 mAh -> 1.12 mAh |
| Example 14 | EC/DMC 5:95 wt % 1M LiPF$_6$ | 92.5%/1.48 mAh -> 1.37 mAh |
| Example 15 | EC/DMC 20:80 wt % 1M LiPF$_6$ | 95.8%/1.47 mAh -> 1.41 mAh |
| Example 16 | EC/DMC 30:70 wt % 1M LiPF$_6$ | 93.3%/1.39 mAh -> 1.30 mAh |
| Example 17 | EC/DMC 50:50 wt % 1M LiPF$_6$ | 57.7%/1.08 mAh -> 0.62 mAh |

Referring to Table 2, it can be confirmed that the coin cells of Examples 1 and 10 including 10 to 20 wt % of FEC as a cyclic carbonate exhibited superior capacity retention ratios as compared to other coin cells.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A lithium secondary battery comprising a cathode comprising a spinel-structure lithium nickel manganese composite oxide represented by Formula 1 below as a cathode active material; an anode comprising a lithium metal oxide represented by Formula 2 below as an anode active material; and an electrolyte comprising a non-aqueous solvent and a lithium salt, wherein the non-aqueous solvent consists of:
1 to 60 wt % of a cyclic carbonate based on a total weight of the non-aqueous solvent, and
40 to 99 wt % of a linear solvent based on a total weight of the non-aqueous solvent,
wherein the cyclic carbonate is FEC, and the linear solvent is DMC or MP, $$Li_xM_yMn_{2-y}O_{4-z}A_z \quad (1)$$

$$Li_aM'_bO_{4-c}A'_c \quad (2)$$

wherein, in Formula 1, 0.9≤x≤1.2, 0<y<2, and 0≤z<0.2;
M is at least one element selected from the group consisting of Al, Mg, Ni, Co, Fe, Cr, V, Ti, Cu, B, Ca, Zn, Zr, Nb, Mo, Sr, Sb, W, Ti, and Bi; and
A is at least one monovalent or divalent anion,
wherein, in Formula 2, M' is at least one element selected from the group consisting of Ti, Sn, Cu, Pb, Sb, Zn, Fe, In, Al, and Zr;
0.1≤a≤4 and 0.2≤b≤4, wherein a and b are determined according to oxidation number of M';
0≤c<0.2, wherein c is determined according to oxidation number of A'; and
A' is at least one monovalent or divalent anion.

2. The lithium secondary battery according to claim 1, wherein the spinel-structure lithium nickel manganese composite oxide of Formula 1 is represented by Formula 3 below:

$$Li_xNi_yMn_{2-y}O_4 \quad (3)$$

wherein 0.9 ≤x≤1.2 and 0.4 ≤y≤0.5.

3. The lithium secondary battery according to claim 2, wherein the spinel-structure lithium nickel manganese composite oxide of Formula 3 is $LiNi_{0.5}Mn_{1.5}O_4$ or $LiNi_{0.4}Mn_{1.6}O_4$.

4. The lithium secondary battery according to claim 1, wherein the lithium metal oxide of Formula 2 is a lithium metal oxide represented by Formula 4 below:

$$Li_aTi_bO_4 \quad (4)$$

wherein 0.5 ≤a≤3 and 1 ≤b≤2.5.

5. The lithium secondary battery according to claim 4, wherein the lithium metal oxide of Formula 4 is $Li_{1.33}Ti_{1.67}O_4$ or $LiTi_2O_4$.

6. A battery module comprising the lithium secondary battery according to claim 1 as a unit cell.

7. A battery pack comprising the battery module according to claim 6.

8. A device comprising the battery pack according to claim 7.

9. The device according to claim 8, wherein the device is an electric vehicle, a hybrid electric vehicle, a plug-in hybrid electric vehicle, or a system for storing power.

* * * * *